US011812767B2

(12) United States Patent
Itoyama et al.

(10) Patent No.: US 11,812,767 B2
(45) Date of Patent: Nov. 14, 2023

(54) BEVERAGE HAVING REB D AND REB M (71) Applicant: SUNTORY HOLDINGS LIMITED, Osaka (JP)

(72) Inventors: Akinori Itoyama, Kanagawa (JP); Yoji Asami, Kanagawa (JP); Akiko Fujie, Kanagawa (JP); Shigeru Sarada, Kanagawa (JP)

(73) Assignee: SUNTORY HOLDINGS LIMITED, Osaka (JP)

( * ) Notice: Subject to any disclaimer, the term of this patent is extended or adjusted under 35 U.S.C. 154(b) by 0 days.

(21) Appl. No.: 16/772,426

(22) PCT Filed: Dec. 26, 2019

(86) PCT No.: PCT/JP2019/051650
§ 371 (c)(1),
(2) Date: Jun. 12, 2020

(87) PCT Pub. No.: WO2020/138508
PCT Pub. Date: Jul. 2, 2020

(65) Prior Publication Data
US 2021/0195921 A1 Jul. 1, 2021

(30) Foreign Application Priority Data
Dec. 28, 2018 (JP) .................. 2018-247884

(51) Int. Cl.
*A61K 36/00* (2006.01)
*A23L 2/60* (2006.01)
*A23L 29/30* (2016.01)
*A23L 27/10* (2016.01)

(52) U.S. Cl.
CPC .............. *A23L 2/60* (2013.01); *A23L 27/10* (2016.08); *A23L 29/30* (2016.08)

(58) Field of Classification Search
None
See application file for complete search history.

(56) References Cited

U.S. PATENT DOCUMENTS

| | | |
|---|---|---|
| 2011/0189360 A1 | 8/2011 | Yoo et al. |
| 2014/0099403 A1 | 4/2014 | Prakash et al. |
| 2014/0342043 A1 | 11/2014 | Bell et al. |
| 2015/0017284 A1 | 1/2015 | Prakash et al. |
| 2018/0371002 A1* | 12/2018 | Zhu .................. C07H 15/24 |
| 2019/0116836 A1* | 4/2019 | Nakajima ............ A23L 2/52 |

FOREIGN PATENT DOCUMENTS

WO 2017/171000 10/2017

OTHER PUBLICATIONS

Goyal et al. (2010) Inter. J. Food Sciences and Nutr. 61(1): 1-10. (Year: 2010).*
Peteliuk et al. (2021) EXCLI Journal 20: 1412-1430. (Year: 2021).*
Prakash et al. (2014) Foods 3, 162-175. (Year: 2014).*
Reddy et al. (2016) J. Am. Dent. Assoc. 147(4): 255-263. (Year: 2016).*
Prakash et al., "Development of Next Generation Stevia Sweetener: Rebaudioside M" *Foods* 3:162-175 (2014).
International Search Report issued in PCT/JP2019/051650, dated Mar. 24, 2020.
Written Opinion of the International Searching Authority issued in PCT/JP2019/051650, dated Mar. 24, 2020.
Partial Supplementary European Search Report issued in EP Patent Application No. 19903291.3, dated Aug. 19, 2022.

* cited by examiner

*Primary Examiner* — Russell G Fiebig
(74) *Attorney, Agent, or Firm* — GREENBLUM & BERNSTEIN, P.L.C.

(57) ABSTRACT

The present invention relates to sweetened beverage compositions comprising the steviol glycoside rebaudioside D (Reb D) and combinations of Reb D and rebaudioside M (Reb M). The present invention also relates to methods to reduce the degradation and improve the stability of Reb D.

16 Claims, 4 Drawing Sheets

BEVERAGE HAVING REB D AND REB M

FIELD OF THE INVENTION

The present invention relates to sweetened beverage compositions comprising the steviol glycoside rebaudioside D (Reb D) and combinations of Reb D and rebaudioside M (Reb M). The present invention also relates to methods to reduce the degradation and improve the stability of Reb D.

BACKGROUND TO THE INVENTION

Sweeteners are used in beverages to impart a pleasant sweet taste. However, the use of caloric sweeteners such as sucrose, glucose fructose etc. has been linked to a wide array of health concerns. In particular obesity, diabetes, high cholesterol, tooth decay etc. have been linked to high sugar consumption.

Therefore, natural high intensity low-caloric sweeteners are a desirable alternative to sugars. These products possess a sweetness level many times that of sucrose and their use can substantially reduce the number of calories present in a beverage or foodstuff. However, although these products produce a very sweet taste they can have negative taste aspects, which consumers may dislike. As such there has been much research into identifying high intensity sweeteners with the most desirable taste profile i.e. one that mimics sucrose.

One of compounds that has been investigated for this reason is the steviol glycosides. These compounds are found in the leaves of the plant *Stevia rebaudiana*. This plant is a perennial shrub of the Asteraceae (Compositae) family which is native to certain regions of South America. The leaves of the plant have been used for hundreds of years to sweeten tea and in traditional medicines. Crude stevia extracts were first commercialized as sweeteners in Japan in the early 1970s and the stevia plant is commercially cultivated in parts of Asia and South America.

Figure 1:
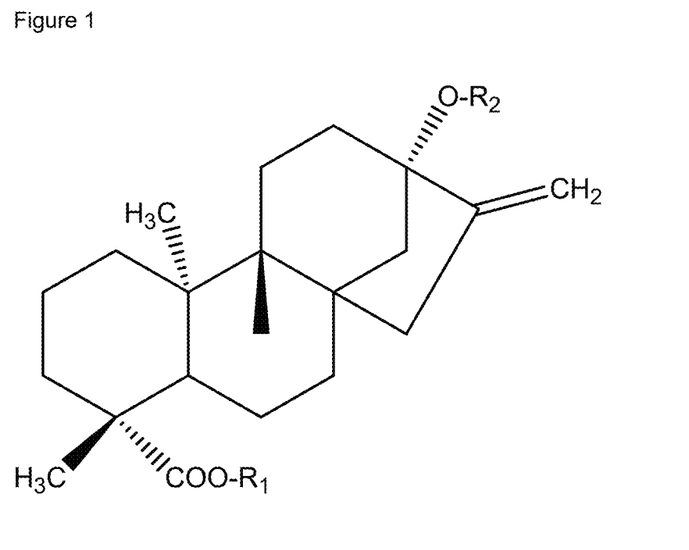
FIG. 1 shows the core aglycone steviol moiety that is common between all rebaudiosides. The rebaudiosides vary in terms of the sugar moieties that are attached at C13 and C19.

To date a large number of different sweet tasting steviol glycosides have been identified and characterised. The compounds all contain a common aglycone steviol (ent-13-hydroxykaur-16-en-19-oic acid) shown in FIG. 1. The steviol glycosides then differ in the number and type of sugars which are attached at positions C13 and C19.

TABLE 1

| Compound | R groups on steviol | | Sweetness potency (relative to sucrose) |
|---|---|---|---|
| | $R^1$ | $R^2$ | |
| Rebaudioside A | β-glc- | (β-glc-)$_2$- β-glc- | 200-300 |
| Rebaudioside B | H | (β-glc-)$_2$- β-glc- | 150 |
| Rebaudioside C | β-glc- | (β-glc, α-rha)-β-glc- | 30 |
| Rebaudioside D | β-glc- β-glc- | (β-glc-)$_2$- β-glc- | 221 |
| Rebaudioside E | β-glc- β-glc- | β-glc- β-glc- | 174 |
| Rebaudioside F | β-glc- | (β-glc, β-xyl)-β-glc- | 200 |
| Rebaudioside M | (β-glc-)$_2$- β-glc- | (β-glc-)$_2$- β-glc- | 200-250 |
| Rubusoside | β-glc- | β-glc- | 114 |
| Steviolbioside | H | β-glc- β-glc- | 90 |
| Stevioside | β-glc- | β-glc- β-glc- | 150-250 |

As can be seen from the above table rebaudioside D (Reb D) has a high sweetness potency. It has been identified as having a good sweetness profile and a reduced bitter aftertaste compared to other rebaudiosides such as Reb A. Therefore, Reb D is may be a suitable candidate for use as a low calorie sweetener in foodstuffs and beverages.

SUMMARY OF THE INVENTION

Rebaudiosides have been shown to degrade in aqueous conditions. It has been discovered that this degradation process can produce unwanted compounds that may negatively impact the taste of a beverage. Since there is a desire to use Reb D in beverage products, there is a need to find compositions and conditions at which degradation of this high potency sweetener is reduced.

The present invention provides beverage compositions in which the stability of Reb D is improved and methods of improving Reb D stability.

Reb D is a highly desirable rebaudioside due to its clean sweet taste. Reb D may be used in beverages as a sweetening component as a low-calorie alternative to sucrose or high fructose corn syrup (HFCS). However, the present inventors have found that Reb D degrades in aqueous beverages, in particular at low pH. Degradation of Reb D may lead to the formation of impurities and reduce the amount of rebaudioside D present in a composition. As such degradation may negatively affect the taste and shelf-life of a product that has been sweetened with this rebaudioside. Therefore, the present invention provides compositions of Reb D wherein the degradation is reduced. This will allow the production of Reb D products with improved shelf-life and reduce the likelihood of forming degradation products which negatively impact the taste profile of the beverage.

The data presented herein has surprisingly shown that by combining Reb D with Reb M the rate at which Reb D degrades at acidic pH is reduced. When Reb D is present in a beverage composition on its own the rate of degradation is quicker compared to when Reb M is also present.

It has also surprisingly been found that the ratio in which the Reb D and Reb M is combined has an effect on the stability of the Reb D. Combining the two rebaudiosides in a ratio of about 1:1 in the pH range 2.0 to 2.5 results in a composition wherein the Reb D is most stable, compared to on its own.

Furthermore, across pH 2.0 to 3.5 it has been observed that the low concentration sample of Reb D degraded more quickly than the higher concentration samples. In particular, at pH 3.5, 20% of the 50 ppm Reb D sample degraded compared to only 5% of the 400 ppm Reb D sample after 8 weeks.

The present invention provides beverage compositions comprising the high potency sweetener Reb D, wherein the stability of the Reb D is improved. These compositions will have improved shelf-life and minimise any negative effect that degradation products could have on the beverage.

A first aspect of the invention is a beverage comprising from 50 ppm to 350 ppm of Reb D and from 50 ppm to 350 ppm of Reb M, and having a pH from pH 1.8 to 2.8.

A second aspect of the invention is a method for improving the stability of Reb D in a beverage, comprising preparing a beverage comprising from 150 ppm to 400 ppm Reb D, and having a pH from pH 2.0 to 4.0.

A third aspect of the invention is a method for improving the stability of Reb D in a beverage comprising adding Reb M to a beverage comprising Reb D, wherein the beverage has a pH from pH 1.8 to 2.8.

DETAILED DESCRIPTION

The present invention aims to produce a beverage comprising Reb D wherein the degradation of Reb D is reduced. As such, beverage compositions are provided wherein the conditions result in a more stable Reb D.

Figure 2:
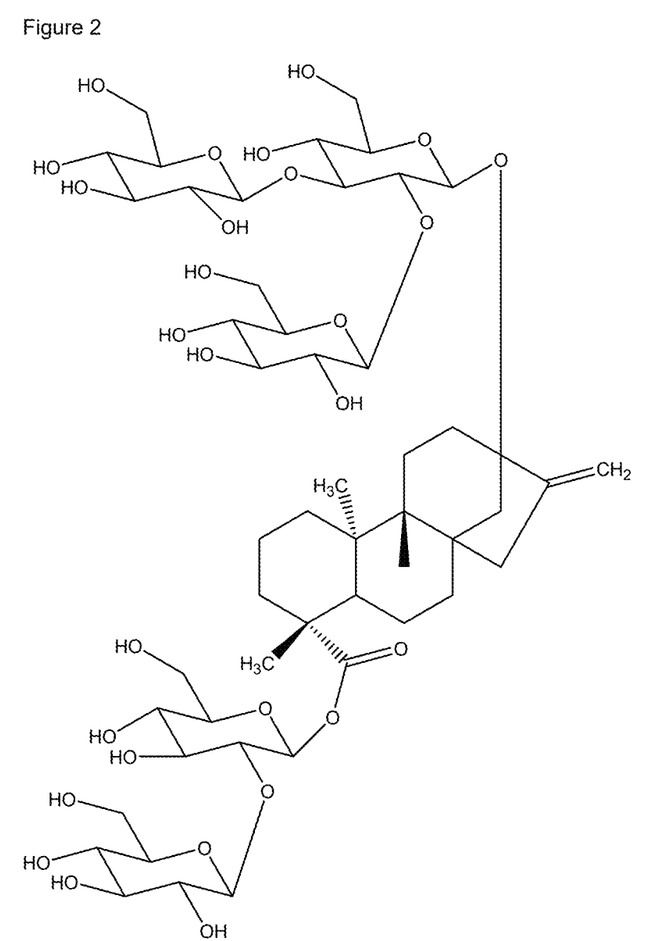
FIG. 2 shows the structure of rebaudioside D (Reb D).
Figure 3:
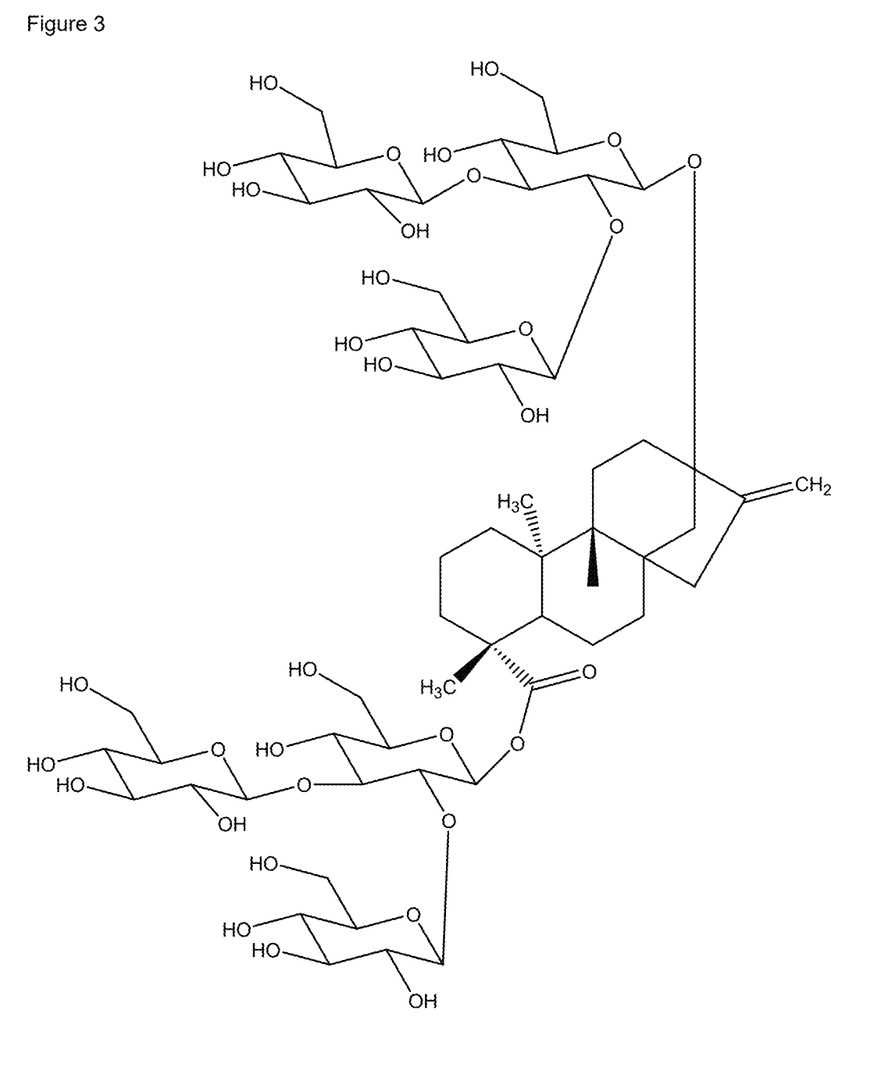
FIG. 3 shows the structure of rebaudioside M (Reb M).

The data presented herein demonstrates that Reb D is more stable and degrades less in a beverage comprising from 150 ppm to 400 ppm Reb D, and having a pH from pH 2.0 to 4.0. Reb D is a steviol glycoside with the chemical formula $C_{50}H_{80}O_{28}$ and the structure according to FIG. 2. Reb D may be obtained naturally from stevia leaves, synthetically or by production in a recombinant host organism. Methods to extract Reb D are well known in the art and any of such methods may be used to prepare the Reb D for use in the present invention.

The data presented herein demonstrates that at low concentrations, approximately 50 ppm, Reb D degrades faster between pH 2.0 to 4.0. Therefore, in an embodiment the beverage comprises from 150 ppm to 400 ppm of Reb D and a pH from pH 2.0 to 4.0. The concentration of Reb D in the beverage according to the first aspect of the invention may be between 150 ppm to 400 ppm, 175 ppm to 400 ppm, 200 ppm to 400 ppm, 225 ppm to 400 ppm, 250 ppm to 400 ppm, 275 ppm to 400 ppm, 300 ppm to 400 ppm, 325 pm to 400 ppm, 350 ppm to 400 ppm, 375 ppm to 400 ppm, 150 ppm to 375 ppm, 175 ppm to 375 ppm, 200 ppm to 375 ppm, 225 ppm to 375 ppm, 250 ppm to 375 ppm, 275 ppm to 375 ppm, 300 ppm to 375 ppm, 325 ppm to 375 ppm, 350 ppm to 375 ppm, 150 ppm to 350 ppm, 175 ppm to 350 ppm, 200 ppm to 350 ppm, 225 ppm to 350 ppm, 250 ppm to 350 ppm, 275 ppm to 350 ppm, 300 ppm to 350 ppm, 325 ppm to 350 ppm, 150 ppm to 325 ppm, 175 ppm to 325 ppm, 200 ppm to 325 ppm, 225 ppm to 325 ppm, 250 ppm to 325 ppm, 275 ppm to 325 ppm, 300 ppm to 325 ppm, 150 ppm to 300 ppm, 175 ppm to 300 ppm, 200 ppm to 300 ppm, 225 ppm to 300 ppm, 250 ppm to 300 ppm, 275 ppm to 300 ppm, 150 ppm to 275 ppm, 175 ppm to 275 ppm, 200 ppm to 275 ppm, 225 ppm to 275 ppm, 250 ppm to 275 ppm, 150 ppm to 250 ppm, 175 ppm to 250 ppm, 200 ppm to 250 ppm, 225 ppm to 250 ppm, 150 ppm to 225 ppm, 175 ppm to 225 ppm, 200 ppm to 225 ppm, 150 ppm to 200 ppm, 175 ppm to 200 ppm, or 150 ppm to 175 ppm.

In an embodiment the beverage comprises a pH from pH 2.0 to 3.8 and Reb D in a concentration from 160 ppm to 190 ppm, 210 ppm to 290 ppm, 310 ppm to 350 ppm, or 370 ppm to 400 ppm.

In an embodiment the beverage comprises a pH from pH 2.5 to 3.8 and Reb D in a concentration from 150 ppm to 400 ppm, 175 ppm to 400 ppm, 200 ppm to 400 ppm, 225 ppm to 400 ppm, 250 ppm to 400 ppm, 275 ppm to 400 ppm, 300 ppm to 400 ppm, 325 pm to 400 ppm, 350 ppm to 400 ppm, 375 ppm to 400 ppm, 150 ppm to 375 ppm, 175 ppm to 375 ppm, 200 ppm to 375 ppm, 225 ppm to 375 ppm, 250 ppm to 375 ppm, 275 ppm to 375 ppm, 300 ppm to 375 ppm, 325 ppm to 375 ppm, 350 ppm to 375 ppm, 150 ppm to 350 ppm, 175 ppm to 350 ppm, 200 ppm to 350 ppm, 225 ppm to 350 ppm, 250 ppm to 350 ppm, 275 ppm to 350 ppm, 300 ppm to 350 ppm, 325 ppm to 350 ppm, 150 ppm to 325 ppm, 175 ppm to 325 ppm, 200 ppm to 325 ppm, 225 ppm to 325 ppm, 250 ppm to 325 ppm, 275 ppm to 325 ppm, 300 ppm to 325 ppm, 150 ppm to 300 ppm, 175 ppm to 300 ppm, 200 ppm to 300 ppm, 225 ppm to 300 ppm, 250 ppm to 300 ppm, 275 ppm to 300 ppm, 150 ppm to 275 ppm, 175 ppm to 275 ppm, 200 ppm to 275 ppm, 225 ppm to 275 ppm, 250 ppm to 275 ppm, 150 ppm to 250 ppm, 175 ppm to 250 ppm, 200 ppm to 250 ppm, 225 ppm to 250 ppm, 150 ppm to 225 ppm, 175 ppm to 225 ppm, 200 ppm to 225 ppm, 150 ppm to 200 ppm, 175 ppm to 200 ppm, or 150 ppm to 175 ppm.

In an embodiment the beverage comprises a pH from pH 2.5 to 3.8 and Reb D in a concentration from 160 ppm to 190 ppm, 210 ppm to 290 ppm, 310 ppm to 350 ppm, or 370 ppm to 400 ppm.

In an embodiment the beverage comprises a pH from pH 3.0 to 3.8 and Reb D in a concentration from 150 ppm to 400 ppm, 175 ppm to 400 ppm, 200 ppm to 400 ppm, 225 ppm to 400 ppm, 250 ppm to 400 ppm, 275 ppm to 400 ppm, 300 ppm to 400 ppm, 325 pm to 400 ppm, 350 ppm to 400 ppm, 375 ppm to 400 ppm, 150 ppm to 375 ppm, 175 ppm to 375 ppm, 200 ppm to 375 ppm, 225 ppm to 375 ppm, 250 ppm to 375 ppm, 275 ppm to 375 ppm, 300 ppm to 375 ppm, 325 ppm to 375 ppm, 350 ppm to 375 ppm, 150 ppm to 350 ppm, 175 ppm to 350 ppm, 200 ppm to 350 ppm, 225 ppm to 350 ppm, 250 ppm to 350 ppm, 275 ppm to 350 ppm, 300 ppm to 350 ppm, 325 ppm to 350 ppm, 150 ppm to 325 ppm, 175 ppm to 325 ppm, 200 ppm to 325 ppm, 225 ppm to 325 ppm, 250 ppm to 325 ppm, 275 ppm to 325 ppm, 300 ppm to 325 ppm, 150 ppm to 300 ppm, 175 ppm to 300 ppm, 200 ppm to 300 ppm, 225 ppm to 300 ppm, 250 ppm to 300 ppm, 275 ppm to 300 ppm, 150 ppm to 275 ppm, 175 ppm to 275 ppm, 200 ppm to 275 ppm, 225 ppm to 275 ppm, 250 ppm to 275 ppm, 150 ppm to 250 ppm, 175 ppm to 250 ppm, 200 ppm to 250 ppm, 225 ppm to 250 ppm, 150 ppm to 225 ppm, 175 ppm to 225 ppm, 200 ppm to 225 ppm, 150 ppm to 200 ppm, 175 ppm to 200 ppm, or 150 ppm to 175 ppm.

In an embodiment the beverage comprises a pH from pH 3.0 to 3.8 and Reb D in a concentration from 160 ppm to 190 ppm, 210 ppm to 290 ppm, 310 ppm to 350 ppm, or 370 ppm to 400 ppm.

In an embodiment the beverage comprises a pH from pH 3.0 to 3.5 and Reb D in a concentration from 150 ppm to 400 ppm, 175 ppm to 400 ppm, 200 ppm to 400 ppm, 225 ppm to 400 ppm, 250 ppm to 400 ppm, 275 ppm to 400 ppm, 300 ppm to 400 ppm, 325 pm to 400 ppm, 350 ppm to 400 ppm, 375 ppm to 400 ppm, 150 ppm to 375 ppm, 175 ppm to 375 ppm, 200 ppm to 375 ppm, 225 ppm to 375 ppm, 250 ppm to 375 ppm, 275 ppm to 375 ppm, 300 ppm to 375 ppm, 325 ppm to 375 ppm, 350 ppm to 375 ppm, 150 ppm to 350 ppm, 175 ppm to 350 ppm, 200 ppm to 350 ppm, 225 ppm to 350 ppm, 250 ppm to 350 ppm, 275 ppm to 350 ppm, 300 ppm to 350 ppm, 325 ppm to 350 ppm, 150 ppm to 325 ppm, 175 ppm to 325 ppm, 200 ppm to 325 ppm, 225 ppm to 325 ppm, 250 ppm to 325 ppm, 275 ppm to 325 ppm, 300 ppm to 325 ppm, 150 ppm to 300 ppm, 175 ppm to 300 ppm, 200 ppm to 300 ppm, 225 ppm to 300 ppm, 250 ppm to 300 ppm, 275 ppm to 300 ppm, 150 ppm to 275 ppm, 175 ppm to 275 ppm, 200 ppm to 275 ppm, 225 ppm to 275 ppm, 250 ppm to 275 ppm, 150 ppm to 250 ppm, 175 ppm to 250 ppm, 200 ppm to 250 ppm, 225 ppm to 250 ppm, 150 ppm to 225 ppm, 175 ppm to 225 ppm, 200 ppm to 225 ppm, 150 ppm to 200 ppm, 175 ppm to 200 ppm, or 150 ppm to 175 ppm.

In an embodiment the beverage comprises a pH from pH 3.0 to 3.5 and Reb D in a concentration from 160 ppm to 190 ppm, 210 ppm to 290 ppm, 310 ppm to 350 ppm, or 370 ppm to 400 ppm.

The data presented herein has shown that a number of factors can influence the degradation of Reb D. It has surprisingly been shown that the addition of Reb M into a beverage composition may help to stabilise the Reb D at certain pH. Accordingly a first aspect of the invention is a beverage comprising from 50 ppm to 350 ppm of Reb D and from 50 ppm to 350 ppm of Reb M, and having a pH from pH 1.8 to 2.8.

In an embodiment of the first aspect of the invention the beverage has a pH from pH 1.8 to 2.8 and Reb D present in a concentration from 50 ppm to 350 ppm, 80 ppm to 350 ppm, 100 ppm to 350 ppm, 150 ppm to 350 ppm, 200 ppm to 350 ppm, 250 ppm to 350 ppm, 300 ppm to 350 ppm, 50 ppm to 320 ppm, 80 ppm to 320 ppm, 100 ppm to 320 ppm, 150 ppm to 320 ppm, 200 ppm to 320 ppm, 250 ppm to 320 ppm, 300 ppm to 320 ppm, 50 ppm to 300 ppm, 80 ppm to 300 ppm, 100 ppm to 300 ppm, 150 ppm to 300 ppm, 200 ppm to 300 ppm, 250 ppm to 300 ppm, 50 ppm to 250 ppm, 80 ppm to 250 ppm, 100 ppm to 250 ppm, 150 ppm to 250 ppm, 200 ppm to 250 ppm, 50 ppm to 200 ppm, 80 ppm to 200 ppm, 100 ppm to 200 ppm, 150 ppm to 200 ppm, 50 ppm to 150 ppm, 80 ppm to 150 ppm, 100 ppm to 150 ppm, 50 ppm to 100 ppm, 80 ppm to 100 ppm, or 50 ppm to 80 ppm and Reb M present in a concentration from 50 ppm to 350 ppm, 80 ppm to 350 ppm, 100 ppm to 350 ppm, 150 ppm to 350 ppm, 200 ppm to 350 ppm, 250 ppm to 350 ppm, 300 ppm to 350 ppm, 50 ppm to 320 ppm, 80 ppm to 320 ppm, 100 ppm to 320 ppm, 150 ppm to 320 ppm, 200 ppm to 320 ppm, 250 ppm to 320 ppm, 300 ppm to 320 ppm, 50 ppm to 300 ppm, 80 ppm to 300 ppm, 100 ppm to 300 ppm, 150 ppm to 300 ppm, 200 ppm to 300 ppm, 250 ppm to 300 ppm, 50 ppm to 250 ppm, 80 ppm to 250 ppm, 100 ppm to 250 ppm, 150 ppm to 250 ppm, 200 ppm to 250 ppm, 50 ppm to 200 ppm, 80 ppm to 200 ppm, 100 ppm to 200 ppm, 150 ppm to 200 ppm, 50 ppm to 150 ppm, 80 ppm to 150 ppm, 100 ppm to 150 ppm, 50 ppm to 100 ppm, 80 ppm to 100 ppm, or 50 ppm to 80 ppm.

In an embodiment of the first aspect of the invention the beverage has a pH from pH 2.0 to 2.5 and Reb D present in a concentration from 50 ppm to 350 ppm, 80 ppm to 350 ppm, 100 ppm to 350 ppm, 150 ppm to 350 ppm, 200 ppm to 350 ppm, 250 ppm to 350 ppm, 300 ppm to 350 ppm, 50 ppm to 320 ppm, 80 ppm to 320 ppm, 100 ppm to 320 ppm, 150 ppm to 320 ppm, 200 ppm to 320 ppm, 250 ppm to 320 ppm, 300 ppm to 320 ppm, 50 ppm to 300 ppm, 80 ppm to 300 ppm, 100 ppm to 300 ppm, 150 ppm to 300 ppm, 200 ppm to 300 ppm, 250 ppm to 300 ppm, 50 ppm to 250 ppm, 80 ppm to 250 ppm, 100 ppm to 250 ppm, 150 ppm to 250 ppm, 200 ppm to 250 ppm, 50 ppm to 200 ppm, 80 ppm to 200 ppm, 100 ppm to 200 ppm, 150 ppm to 200 ppm, 50 ppm to 150 ppm, 80 ppm to 150 ppm, 100 ppm to 150 ppm, 50 ppm to 100 ppm, 80 ppm to 100 ppm, or 50 ppm to 80 ppm and Reb M present in a concentration from 50 ppm to 350 ppm, 80 ppm to 350 ppm, 100 ppm to 350 ppm, 150 ppm to 350 ppm, 200 ppm to 350 ppm, 250 ppm to 350 ppm, 300 ppm to 350 ppm, 50 ppm to 320 ppm, 80 ppm to 320 ppm, 100 ppm to 320 ppm, 150 ppm to 320 ppm, 200 ppm to 320 ppm, 250 ppm to 320 ppm, 300 ppm to 320 ppm, 50 ppm to 300 ppm, 80 ppm to 300 ppm, 100 ppm to 300 ppm, 150 ppm to 300 ppm, 200 ppm to 300 ppm, 250 ppm to 300 ppm, 50 ppm to 250 ppm, 80 ppm to 250 ppm, 100 ppm to 250 ppm, 150 ppm to 250 ppm, 200 ppm to 250 ppm, 50 ppm to 200 ppm, 80 ppm to 200 ppm, 100 ppm to 200 ppm, 150 ppm to 200 ppm, 50 ppm to 150 ppm, 80 ppm to 150 ppm, 100 ppm to 150 ppm, 50 ppm to 100 ppm, 80 ppm to 100 ppm, or 50 ppm to 80 ppm.

In an embodiment of the first aspect of the invention the beverage has a pH of 2.0 and Reb D present in a concentration from 50 ppm to 350 ppm, 80 ppm to 350 ppm, 100 ppm to 350 ppm, 150 ppm to 350 ppm, 200 ppm to 350 ppm, 250 ppm to 350 ppm, 300 ppm to 350 ppm, 50 ppm to 320 ppm, 80 ppm to 320 ppm, 100 ppm to 320 ppm, 150 ppm to 320 ppm, 200 ppm to 320 ppm, 250 ppm to 320 ppm, 300 ppm to 320 ppm, 50 ppm to 300 ppm, 80 ppm to 300 ppm, 100 ppm to 300 ppm, 150 ppm to 300 ppm, 200 ppm to 300 ppm, 250 ppm to 300 ppm, 50 ppm to 250 ppm, 80 ppm to 250 ppm, 100 ppm to 250 ppm, 150 ppm to 250 ppm, 200 ppm to 250 ppm, 50 ppm to 200 ppm, 80 ppm to 200 ppm, 100 ppm to 200 ppm, 150 ppm to 200 ppm, 50 ppm to 150 ppm, 80 ppm to 150 ppm, 100 ppm to 150 ppm, 50 ppm to 100 ppm, 80 ppm to 100 ppm, or 50 ppm to 80 ppm and Reb M present in a concentration from 50 ppm to 350 ppm, 80 ppm to 350 ppm, 100 ppm to 350 ppm, 150 ppm to 350 ppm, 200 ppm to 350 ppm, 250 ppm to 350 ppm, 300 ppm to 350 ppm, 50 ppm to 320 ppm, 80 ppm to 320 ppm, 100 ppm to 320 ppm, 150 ppm to 320 ppm, 200 ppm to 320 ppm, 250 ppm to 320 ppm, 300 ppm to 320 ppm, 50 ppm to 300 ppm, 80 ppm to 300 ppm, 100 ppm to 300 ppm, 150 ppm to 300 ppm, 200 ppm to 300 ppm, 250 ppm to 300 ppm, 50 ppm to 250 ppm, 80 ppm to 250 ppm, 100 ppm to 250 ppm, 150 ppm to 250 ppm, 200 ppm to 250 ppm, 50 ppm to 200 ppm, 80 ppm to 200 ppm, 100 ppm to 200 ppm, 150 ppm to 200 ppm, 50 ppm to 150 ppm, 80 ppm to 150 ppm, 100 ppm to 150 ppm, 50 ppm to 100 ppm, 80 ppm to 100 ppm, or 50 ppm to 80 ppm.

In an embodiment of the first aspect of the invention the Reb D and Reb M are present in a weight ratio from 1:4 to 4:1 and the pH of the beverage is from pH 1.8 to 2.8. It is demonstrated herein that at low pH the addition of Reb M helps to stabilise the lower concentrations of Reb D, when compared to the low concentration of Reb D alone. For example at pH 2.0 the 50 ppm Reb D sample degrades approx. 10% more than the 80 ppm Reb D sample in combination with 320 ppm Reb M. As such, it may be preferable to have the Reb D and Reb M present in a weight ratio from 1:4 to 1:2. Further, the Reb D and Reb M may be present in a weight ratio from 1:4 to 1:2, wherein the Reb D is present in a concentration from 50 ppm to 150 ppm.

Further, the data herein demonstrates that a beverage composition having a pH from 1.8 to 2.8, and a 1:1 weight ratio of Reb D:Reb M has the best stability when compared to the other ratios. As such it may be preferable to have Reb D and Reb M present in the beverage at a weight ratio from 1:2 to 2:1, more preferably at a weight ratio of about 1:1, and the pH is from pH 1.8 to 2.8.

In an embodiment Reb D and Reb M are present in the beverage at a weight ratio from 1:2 to 2:1, preferably at a weight ratio of about 1:1, and the pH is from pH 1.8 to 2.2. The term "about" as used herein indicates that a margin of +/−10% is applicable to the stated value.

In an embodiment of the first aspect of the invention the Reb D and Reb M may be present in an amount to produce a final total concentration of 200 ppm to 800 ppm, 200 ppm to 700 ppm, 200 ppm to 600 ppm, 200 ppm to 500 ppm, 200 ppm to 400 ppm, 300 ppm to 800 ppm, 300 pm to 700 ppm, 300 ppm, to 600 ppm, 300 ppm to 500 ppm, 300 ppm to 400 ppm, 400 ppm to 800 ppm, 400 ppm to 700 ppm, 400 ppm to 600 ppm, or 400 ppm to 500 ppm.

Given the importance of the pH to the stability of the beverage, a buffer system is preferably used. Suitable buffer systems of use in the present invention include, by way of example only, tartaric, fumaric, maleic, phosphoric, and acetic acids and salts. Preferred buffering systems include citric acid and phosphoric acid buffer systems. The most preferred buffer system is a citric acid buffer system preferably contains sodium citrate in combination with citric acid. Preferably there is about 0.1 to about 10 grams/litre of sodium citrate, and about 0.05 to about 5 grams/litre of citric acid. Typically suitable buffer systems include those capable of maintaining a pH in the range stated in the embodiments herein.

In an embodiment of the second aspect the beverage may be carbonated. As used herein a "carbonated beverage" is a beverage that contains carbon dioxide gas ($CO_2$). The presence of the $CO_2$ produces bubbles within the beverage.

In an embodiment the carbonated beverage may comprise carbon dioxide ($CO_2$) at a gas pressure from 1.0-3.5 kg/m$^3$. Preferably the $CO_2$ is at a gas pressure from 1.5-3.0 kg/m$^3$, more preferably the $CO_2$ is at a gas pressure from 2.0-3.0 kg/m$^3$.

In another embodiment the carbonated beverage may comprise carbon dioxide ($CO_2$) at a gas pressure from 1.0-3.5 kgf/cm$^2$. Preferably the $CO_2$ is at a gas pressure from 1.5-3.0 kgf/cm$^2$, more preferably the $CO_2$ is at a gas pressure from 2.0-3.0 kgf/cm$^2$.

In an embodiment the beverage is a carbonated beverage wherein the $CO_2$ is at a gas pressure from 1.5-3.0 kg/m$^3$, and the pH of the beverage is from pH 2.3 to 3.5 and the Reb M is present in a concentration from 150 ppm to 400 ppm, or 150 ppm to 300 ppm, or 150 ppm to 250 ppm.

In another embodiment the beverage is a carbonated beverage wherein the $CO_2$ is at a gas pressure from 1.5-3.0 kgf/cm$^2$, and the pH of the beverage is from pH 2.3 to 3.5 and the Reb M is present in a concentration from 150 ppm to 400 ppm, or 150 ppm to 300 ppm, or 150 ppm to 250 ppm.

In an embodiment the beverage is a carbonated beverage wherein the $CO_2$ is at a gas pressure from 1.5-3.0 kg/m$^3$, and the pH of the beverage is from pH 2.5 to 3.5 and the Reb M is present in a concentration from 150 ppm to 400 ppm, or 150 ppm to 300 ppm, or 150 ppm to 250 ppm.

In another embodiment the beverage is a carbonated beverage wherein the $CO_2$ is at a gas pressure from 1.5-3.0 kgf/cm$^2$, and the pH of the beverage is from pH 2.5 to 3.5 and the Reb M is present in a concentration from 150 ppm to 400 ppm, or 150 ppm to 300 ppm, or 150 ppm to 250 ppm.

In an embodiment the beverage is a carbonated beverage wherein the $CO_2$ is at a gas pressure from 1.5-3.0 kg/m$^3$, and the pH of the beverage is from pH 3.0 to 3.5 and the Reb M is present in a concentration from 150 ppm to 400 ppm, or 150 ppm to 300 ppm, or 150 ppm to 250 ppm.

In another embodiment the beverage is a carbonated beverage wherein the $CO_2$ is at a gas pressure from 1.5-3.0 kgf/cm$^2$, and the pH of the beverage is from pH 3.0 to 3.5 and the Reb M is present in a concentration from 150 ppm to 400 ppm, or 150 ppm to 300 ppm, or 150 ppm to 250 ppm.

The beverage according to the first aspect of the present invention may comprise Reb D as the primary sweetening component. The beverage may also comprise other sweetening components such as other steviol sweeteners. Non-limiting examples of steviol sweeteners include Reb A, Reb B, Reb C, Reb E, Reb F, Reb I, Reb H, Reb L, Reb K, Reb J, Reb M, Reb N, Reb O, dulcoside A, dulcoside B, stevioside, steviolbioside, rubusoside.

The beverage according to the first aspect of the present invention may comprise Reb D or Reb M as the primary sweetening component. The beverage may also comprise other sweetening components such as other steviol sweeteners. Non-limiting examples of steviol sweeteners include Reb A, Reb B, Reb C, Reb E, Reb F, Reb I, Reb H, Reb L, Reb K, Reb J, Reb N, Reb O, dulcoside A, dulcoside B, stevioside, steviolbioside, rubusoside.

In one embodiment, a combination of Reb D and Reb M are the sole sweetening components. In this regard, any interactions with other sweetening components which may lead to a decrease in the stability of the combination is avoided.

The beverage according to the first aspect may also comprise additional carbohydrate based sweeteners, non-limiting examples include sucrose, fructose, glucose, erythritol, maltitol, lactitol, sorbitol, mannitol, xylitol, tagatose, trehalose, galactose, rhamnose, cyclodextrin, ribulose, threose, arabinose, xylose, lyxose, allose, altrose, mannose, idose, lactose, maltose, invert sugar, isotrehalose, neotrehalose, palatinose or isomaltulose, erythrose, deoxyribose, gulose, idose, talose, erythrulose, xylulose, psicose, turanose, cellobiose, glucosamine, mannosamine, fucose, fuculose, glucuronic acid, gluconic acid, glucono-lactone, abequose, galactosamine, xylo-oligosaccharides (xylotriose, xylobiose and the like), gentio-oligoscaccharides (gentiobiose, gentiotriose, gentiotetraose, galacto-oligosaccharides, sorbose, ketotriose (dehydroxyacetone), aldotriose (glyceraldehyde), nigero-oligosaccharides, fructooligosaccharides (kestose, nystose and the like), maltotetraose, maltotriol, tetrasaccharides, mannan-oligosaccharides, maltooligosaccharides (maltotriose, maltotetraose, maltopentaose, maltohexaose, maltoheptaose), dextrins, lactulose, melibiose, raffinose, rhamnose, ribose, isomerized liquid sugars such as high fructose corn syrup (HFCS e.g., HFCS55, HFCS42, or HFCS90), coupling sugars, soybean oligosaccharides, glucose syrup and combinations thereof. D- or L-configurations can be used when applicable.

In a preferred embodiment the additional sweetener is selected from sucrose, glucose, fructose and/or HFCS.

Additional sweetening components may be selected from natural high potency sweeteners such as mogroside IV, mogroside V, Luo Han Guo, siamenoside, monatin and its salts (monatin SS, RR, RS, SR), curculin, glycyrrhizic acid and its salts, thaumatin, monellin, mabinlin, brazzein, hernandulcin, phyllodulcin, glycyphyllin, phloridzin, trilobatin, baiyunoside, osladin, polypodoside A, pterocaryoside A, pterocaryoside B, mukurozioside, phlomisoside I, periandrin I, abrusoside A, and cyclocarioside I.

Additional sweetening components may be synthetic sweeteners. As used herein, the phrase "synthetic sweetener" refers to any composition which is not found naturally in nature and characteristically has a sweetness potency greater than sucrose, fructose, or glucose, yet has less calories. Non-limiting examples of synthetic high-potency sweeteners suitable for embodiments of this disclosure include sucralose, potassium acesulfame, acesulfame acid and salts thereof, aspartame, alitame, saccharin and salts thereof, neohesperidin dihydrochalcone, cyclamate, cyclamic acid and salts thereof, neotame, advantame, glucosylated steviol glycosides (GSGs) and combinations thereof.

Any of the additional sweetening components, either carbohydrate sweeteners, natural high potency sweeteners or synthetic sweeteners may be present in the beverage in a concentration from about 0.3 ppm to about 3,500 ppm.

The amount of sucrose in a reference solution may be described in degrees Brix (° Bx). One degree Brix is 1 gram of sucrose in 100 grams of solution and represents the strength of the solution as percentage by weight (% w/w). In one embodiment, a beverage contains Reb D in an amount effective to provide sweetness equivalent from about 0.5 to 14 degrees Brix of sucrose when present in a sweetened composition, such as, for example, from about 5 to about 11 degrees Brix, from about 4 to about 7 degrees Brix, or about 5 degrees Brix. In another embodiment, Reb D is present in an amount effective to provide sweetness equivalent to about 10 degrees Brix.

In an embodiment of the first aspect of the invention, the beverage contains Reb D and Reb M in an amount effective to provide sweetness equivalent from about 0.5 to 14 degrees Brix of sucrose when present in a sweetened composition, such as, for example, from about 5 to about 11 degrees Brix, from about 4 to about 7 degrees Brix, or about 5 degrees Brix. In another embodiment, Reb D and Reb M is present in an amount effective to provide sweetness equivalent to about 10 degrees Brix In various embodiments of the present invention the total sweetness of the beverage is equivalent to 5 to 15 degrees Brix, preferably 7 to 12 degrees Brix, more preferably 9 to 11 degrees Brix. Most preferably the total sweetness of the beverage is equivalent to about 10 degrees Brix.

In addition to Reb D, and optionally other sweetening components, the beverage can optionally include further additives, detailed herein below. In some embodiments, the sweetener composition contains additives such as, carbohydrates, polyols, amino acids and their corresponding salts, poly-amino acids and their corresponding salts, sugar acids and their corresponding salts, nucleotides, organic acids, inorganic acids, organic salts including organic acid salts and organic base salts, inorganic salts, bitter compounds, flavorants and flavoring ingredients, astringent compounds, proteins or protein hydrolysates, surfactants, emulsifiers, weighing agents, gums, antioxidants, colorants, flavonoids, alcohols, polymers and combinations thereof. In some embodiments, the additives act to improve the temporal and flavor profile of the sweetener to provide a beverage composition with excellent taste properties.

In a preferred embodiment the beverage may also comprise cinnamaldehyde, caffeine, caramel colouring and/or phosphoric acid The beverages which are suitable for the present invention include ready-to-drink beverage, a beverage concentrate, a beverage syrup, or a powdered beverage. Suitable ready-to-drink beverages include carbonated and non-carbonated beverages. Carbonated beverages include, but are not limited to, enhanced sparkling beverages, cola, lemon-lime flavored sparkling beverage, orange flavored sparkling beverage, grape flavored sparkling beverage, strawberry flavored sparkling beverage, pineapple flavored sparkling beverage, ginger-ale, soft drinks and root beer. Non-carbonated beverages include, but are not limited to fruit juice, fruit-flavored juice, juice drinks, nectars, vegetable juice, vegetable-flavored juice, sports drinks, energy drinks, enhanced water drinks, enhanced water with vitamins, near water drinks (e.g., water with natural or synthetic flavorants), coconut water, tea type drinks (e.g. black tea, green tea, red tea, oolong tea), coffee, cocoa drink, milk beverages, coffee containing milk components, café au lait, milk tea, fruit milk beverages, beverages containing cereal extracts, smoothies and combinations thereof.

The data presented herein demonstrates that it is possible to improve the stability of Reb D in a beverage composition by controlling the concentration and pH of the beverage. As such a second aspect of the invention is a method for improving the stability of Reb D in a beverage, comprising preparing a beverage comprising from 150 ppm to 400 ppm Reb D, and having a pH from pH 2.0 to 4.0. This has the benefit of producing beverages with better shelf life as the sweetening agent will remain more stable. As such provided herein is a method is to improve the shelf life of a beverage product comprising Reb D.

An embodiment of the second aspect the method comprises preparing a beverage comprising Reb D at a concentration from 150 ppm to 400 ppm, 175 ppm to 400 ppm, 200 ppm to 400 ppm, 225 ppm to 400 ppm, 250 ppm to 400 ppm, 275 ppm to 400 ppm, 300 ppm to 400 ppm, 325 pm to 400 ppm, 350 ppm to 400 ppm, 375 ppm to 400 ppm, 150 ppm to 375 ppm, 175 ppm to 375 ppm, 200 ppm to 375 ppm, 225 ppm to 375 ppm, 250 ppm to 375 ppm, 275 ppm to 375 ppm, 300 ppm to 375 ppm, 325 ppm to 375 ppm, 350 ppm to 375 ppm, 150 ppm to 350 ppm, 175 ppm to 350 ppm, 200 ppm to 350 ppm, 225 ppm to 350 ppm, 250 ppm to 350 ppm, 275 ppm to 350 ppm, 300 ppm to 350 ppm, 325 ppm to 350 ppm, 150 ppm to 325 ppm, 175 ppm to 325 ppm, 200 ppm to 325 ppm, 225 ppm to 325 ppm, 250 ppm to 325 ppm, 275 ppm to 325 ppm, 300 ppm to 325 ppm, 150 ppm to 300 ppm, 175 ppm to 300 ppm, 200 ppm to 300 ppm, 225 ppm to 300 ppm, 250 ppm to 300 ppm, 275 ppm to 300 ppm, 150 ppm to 275 ppm, 175 ppm to 275 ppm, 200 ppm to 275 ppm, 225 ppm to 275 ppm, 250 ppm to 275 ppm, 150 ppm to 250 ppm, 175 ppm to 250 ppm, 200 ppm to 250 ppm, 225 ppm to 250 ppm, 150 ppm to 225 ppm, 175 ppm to 225 ppm, 200 ppm to 225 ppm, 150 ppm to 200 ppm, 175 ppm to 200 ppm, or 150 ppm to 175 ppm, and wherein the pH is from pH 2.0 to 4.0.

In an embodiment of the second aspect the method comprises preparing a beverage comprising Reb D at a concentration from 160 ppm to 190 ppm, 210 ppm to 290 ppm, 310 ppm to 350 ppm, or 370 ppm to 400 ppm, and wherein the pH is from pH 2.0 to 4.0.

In an embodiment of the second aspect the method comprises preparing a beverage with a pH from pH 2.5 to 3.8 and Reb D in a concentration from 150 ppm to 400 ppm, 175 ppm to 400 ppm, 200 ppm to 400 ppm, 225 ppm to 400 ppm, 250 ppm to 400 ppm, 275 ppm to 400 ppm, 300 ppm to 400 ppm, 325 pm to 400 ppm, 350 ppm to 400 ppm, 375 ppm to 400 ppm, 150 ppm to 375 ppm, 175 ppm to 375 ppm, 200 ppm to 375 ppm, 225 ppm to 375 ppm, 250 ppm to 375 ppm, 275 ppm to 375 ppm, 300 ppm to 375 ppm, 325 ppm to 375 ppm, 350 ppm to 375 ppm, 150 ppm to 350 ppm, 175 ppm to 350 ppm, 200 ppm to 350 ppm, 225 ppm to 350 ppm, 250 ppm to 350 ppm, 275 ppm to 350 ppm, 300 ppm to 350 ppm, 325 ppm to 350 ppm, 150 ppm to 325 ppm, 175 ppm to 325 ppm, 200 ppm to 325 ppm, 225 ppm to 325 ppm, 250 ppm to 325 ppm, 275 ppm to 325 ppm, 300 ppm to 325 ppm, 150 ppm to 300 ppm, 175 ppm to 300 ppm, 200 ppm to 300 ppm, 225 ppm to 300 ppm, 250 ppm to 300 ppm, 275 ppm to 300 ppm, 150 ppm to 275 ppm, 175 ppm to 275 ppm, 200 ppm to 275 ppm, 225 ppm to 275 ppm, 250 ppm to 275 ppm, 150 ppm to 250 ppm, 175 ppm to 250 ppm, 200 ppm to 250 ppm, 225 ppm to 250 ppm, 150 ppm to 225 ppm, 175 ppm to 225 ppm, 200 ppm to 225 ppm, 150 ppm to 200 ppm, 175 ppm to 200 ppm, or 150 ppm to 175 ppm.

In an embodiment of the second aspect the method comprises preparing a beverage with a pH from pH 2.5 to 3.8 and Reb D in a concentration from 160 ppm to 190 ppm, 210 ppm to 290 ppm, 310 ppm to 350 ppm, or 370 ppm to 400 ppm.

In an embodiment of the second aspect the method comprises preparing a beverage with a pH from pH 3.0 to 3.8 and Reb D in a concentration from 150 ppm to 400 ppm, 175 ppm to 400 ppm, 200 ppm to 400 ppm, 225 ppm to 400 ppm, 250 ppm to 400 ppm, 275 ppm to 400 ppm, 300 ppm to 400 ppm, 325 pm to 400 ppm, 350 ppm to 400 ppm, 375 ppm to 400 ppm, 150 ppm to 375 ppm, 175 ppm to 375 ppm, 200 ppm to 375 ppm, 225 ppm to 375 ppm, 250 ppm to 375 ppm, 275 ppm to 375 ppm, 300 ppm to 375 ppm, 325 ppm to 375 ppm, 350 ppm to 375 ppm, 150 ppm to 350 ppm, 175 ppm to 350 ppm, 200 ppm to 350 ppm, 225 ppm to 350 ppm, 250 ppm to 350 ppm, 275 ppm to 350 ppm, 300 ppm to 350 ppm, 325 ppm to 350 ppm, 150 ppm to 325 ppm, 175 ppm to 325 ppm, 200 ppm to 325 ppm, 225 ppm to 325 ppm, 250 ppm to 325 ppm, 275 ppm to 325 ppm, 300 ppm to 325 ppm, 150 ppm to 300 ppm, 175 ppm to 300 ppm, 200 ppm to 300 ppm, 225 ppm to 300 ppm, 250 ppm to 300 ppm, 275 ppm to 300 ppm, 150 ppm to 275 ppm, 175 ppm to 275 ppm, 200 ppm to 275 ppm, 225 ppm to 275 ppm, 250 ppm to 275 ppm, 150 ppm to 250 ppm, 175 ppm to 250 ppm, 200 ppm to 250 ppm, 225 ppm to 250 ppm, 150 ppm to 225 ppm, 175 ppm to 225 ppm, 200 ppm to 225 ppm, 150 ppm to 200 ppm, 175 ppm to 200 ppm, or 150 ppm to 175 ppm.

In an embodiment of the second aspect the method comprises preparing a beverage with a pH from pH 3.0 to 3.8 and Reb D in a concentration from 160 ppm to 190 ppm, 210 ppm to 290 ppm, 310 ppm to 350 ppm, or 370 ppm to 400 ppm.

In an embodiment of the second aspect the method comprises preparing a beverage with a pH from pH 3.0 to 3.5 and Reb D in a concentration from 150 ppm to 400 ppm, 175 ppm to 400 ppm, 200 ppm to 400 ppm, 225 ppm to 400 ppm, 250 ppm to 400 ppm, 275 ppm to 400 ppm, 300 ppm to 400 ppm, 325 pm to 400 ppm, 350 ppm to 400 ppm, 375 ppm to 400 ppm, 150 ppm to 375 ppm, 175 ppm to 375 ppm, 200 ppm to 375 ppm, 225 ppm to 375 ppm, 250 ppm to 375 ppm, 275 ppm to 375 ppm, 300 ppm to 375 ppm, 325 ppm to 375 ppm, 350 ppm to 375 ppm, 150 ppm to 350 ppm, 175 ppm to 350 ppm, 200 ppm to 350 ppm, 225 ppm to 350 ppm, 250 ppm to 350 ppm, 275 ppm to 350 ppm, 300 ppm to 350 ppm, 325 ppm to 350 ppm, 150 ppm to 325 ppm, 175 ppm to 325 ppm, 200 ppm to 325 ppm, 225 ppm to 325 ppm, 250 ppm to 325 ppm, 275 ppm to 325 ppm, 300 ppm to 325 ppm, 150 ppm to 300 ppm, 175 ppm to 300 ppm, 200 ppm to 300 ppm, 225 ppm to 300 ppm, 250 ppm to 300 ppm, 275 ppm to 300 ppm, 150 ppm to 275 ppm, 175 ppm to 275 ppm, 200 ppm to 275 ppm, 225 ppm to 275 ppm, 250 ppm to 275 ppm, 150 ppm to 250 ppm, 175 ppm to 250 ppm, 200 ppm to 250 ppm, 225 ppm to 250 ppm, 150 ppm to 225 ppm, 175 ppm to 225 ppm, 200 ppm to 225 ppm, 150 ppm to 200 ppm, 175 ppm to 200 ppm, or 150 ppm to 175 ppm.

In an embodiment of the second aspect the method comprises preparing a beverage with a pH from pH 3.0 to 3.5 and Reb D in a concentration from 160 ppm to 190 ppm, 210 ppm to 290 ppm, 310 ppm to 350 ppm, or 370 ppm to 400 ppm.

The data presented herein demonstrates that it is possible to improve the stability of Reb D in a beverage by adding Reb M. Accordingly a third aspect of the present invention is a method for improving the stability of Reb D in a beverage, comprising adding Reb M to a beverage comprising Reb D, wherein the beverage has a pH from pH 1.8 to 2.8. This has the benefit of producing beverages with better shelf life as the sweetening agent will remain more stable. As such provided herein is a method is to improve the shelf life of a beverage product comprising Reb D.

An embodiment of the third aspect the method comprises preparing a beverage comprising from 50 ppm to 350 ppm of Reb D and from 50 ppm to 350 ppm of Reb M, and having a pH from pH 1.8 to 2.8.

An embodiment of the third aspect the method comprises preparing a beverage with a pH from pH 1.8 to 2.8 and Reb D present in a concentration from 50 ppm to 350 ppm, 80 ppm to 350 ppm, 100 ppm to 350 ppm, 150 ppm to 350 ppm, 200 ppm to 350 ppm, 250 ppm to 350 ppm, 300 ppm to 350 ppm, 50 ppm to 320 ppm, 80 ppm to 320 ppm, 100 ppm to 320 ppm, 150 ppm to 320 ppm, 200 ppm to 320 ppm, 250 ppm to 320 ppm, 300 ppm to 320 ppm, 50 ppm to 300 ppm, 80 ppm to 300 ppm, 100 ppm to 300 ppm, 150 ppm to 300 ppm, 200 ppm to 300 ppm, 250 ppm to 300 ppm, 50 ppm to 250 ppm, 80 ppm to 250 ppm, 100 ppm to 250 ppm, 150 ppm to 250 ppm, 200 ppm to 250 ppm, 50 ppm to 200 ppm, 80 ppm to 200 ppm, 100 ppm to 200 ppm, 150 ppm to 200 ppm, 50 ppm to 150 ppm, 80 ppm to 150 ppm, 100 ppm to 150 ppm, 50 ppm to 100 ppm, 80 ppm to 100 ppm, or 50 ppm to 80 ppm and Reb M present in a concentration from 50 ppm to 350 ppm, 80 ppm to 350 ppm, 100 ppm to 350 ppm, 150 ppm to 350 ppm, 200 ppm to 350 ppm, 250 ppm to 350 ppm, 300 ppm to 350 ppm, 50 ppm to 320 ppm, 80 ppm to 320 ppm, 100 ppm to 320 ppm, 150 ppm to 320 ppm, 200 ppm to 320 ppm, 250 ppm to 320 ppm, 300 ppm to 320 ppm, 50 ppm to 300 ppm, 80 ppm to 300 ppm, 100 ppm to 300 ppm, 150 ppm to 300 ppm, 200 ppm to 300 ppm, 250 ppm to 300 ppm, 50 ppm to 250 ppm, 80 ppm to 250 ppm, 100 ppm to 250 ppm, 150 ppm to 250 ppm, 200 ppm to 250 ppm, 50 ppm to 200 ppm, 80 ppm to 200 ppm, 100 ppm to 200 ppm, 150 ppm to 200 ppm, 50 ppm to 150 ppm, 80 ppm to 150 ppm, 100 ppm to 150 ppm, 50 ppm to 100 ppm, 80 ppm to 100 ppm, or 50 ppm to 80 ppm.

An embodiment of the third aspect the method comprises preparing a beverage with a pH from pH 2.0 to 2.5 and Reb D present in a concentration from 50 ppm to 350 ppm, 80 ppm to 350 ppm, 100 ppm to 350 ppm, 150 ppm to 350 ppm, 200 ppm to 350 ppm, 250 ppm to 350 ppm, 300 ppm to 350 ppm, 50 ppm to 320 ppm, 80 ppm to 320 ppm, 100 ppm to 320 ppm, 150 ppm to 320 ppm, 200 ppm to 320 ppm, 250 ppm to 320 ppm, 300 ppm to 320 ppm, 50 ppm to 300 ppm, 80 ppm to 300 ppm, 100 ppm to 300 ppm, 150 ppm to 300 ppm, 200 ppm to 300 ppm, 250 ppm to 300 ppm, 50 ppm to 250 ppm, 80 ppm to 250 ppm, 100 ppm to 250 ppm, 150 ppm to 250 ppm, 200 ppm to 250 ppm, 50 ppm to 200 ppm, 80 ppm to 200 ppm, 100 ppm to 200 ppm, 150 ppm to 200 ppm, 50 ppm to 150 ppm, 80 ppm to 150 ppm, 100 ppm to 150 ppm, 50 ppm to 100 ppm, 80 ppm to 100 ppm, or 50 ppm to 80 ppm and Reb M present in a concentration from 50 ppm to 350 ppm, 80 ppm to 350 ppm, 100 ppm to 350 ppm, 150 ppm to 350 ppm, 200 ppm to 350 ppm, 250 ppm to 350 ppm, 300 ppm to 350 ppm, 50 ppm to 320 ppm, 80 ppm to 320 ppm, 100 ppm to 320 ppm, 150 ppm to 320 ppm, 200 ppm to 320 ppm, 250 ppm to 320 ppm, 300 ppm to 320 ppm, 50 ppm to 300 ppm, 80 ppm to 300 ppm, 100 ppm to 300 ppm, 150 ppm to 300 ppm, 200 ppm to 300 ppm, 250 ppm to 300 ppm, 50 ppm to 250 ppm, 80 ppm to 250 ppm, 100 ppm to 250 ppm, 150 ppm to 250 ppm, 200 ppm to 250 ppm, 50 ppm to 200 ppm, 80 ppm to 200 ppm, 100 ppm to 200 ppm, 150 ppm to 200 ppm, 50 ppm to 150 ppm, 80 ppm to 150 ppm, 100 ppm to 150 ppm, 50 ppm to 100 ppm, 80 ppm to 100 ppm, or 50 ppm to 80 ppm.

An embodiment of the third aspect the method comprises preparing a beverage with a pH of 2.0 and Reb D present in a concentration from 50 ppm to 350 ppm, 80 ppm to 350 ppm, 100 ppm to 350 ppm, 150 ppm to 350 ppm, 200 ppm to 350 ppm, 250 ppm to 350 ppm, 300 ppm to 350 ppm, 50 ppm to 320 ppm, 80 ppm to 320 ppm, 100 ppm to 320 ppm, 150 ppm to 320 ppm, 200 ppm to 320 ppm, 250 ppm to 320 ppm, 300 ppm to 320 ppm, 50 ppm to 300 ppm, 80 ppm to 300 ppm, 100 ppm to 300 ppm, 150 ppm to 300 ppm, 200 ppm to 300 ppm, 250 ppm to 300 ppm, 50 ppm to 250 ppm, 80 ppm to 250 ppm, 100 ppm to 250 ppm, 150 ppm to 250 ppm, 200 ppm to 250 ppm, 50 ppm to 200 ppm, 80 ppm to 200 ppm, 100 ppm to 200 ppm, 150 ppm to 200 ppm, 50 ppm to 150 ppm, 80 ppm to 150 ppm, 100 ppm to 150 ppm, 50 ppm to 100 ppm, 80 ppm to 100 ppm, or 50 ppm to 80 ppm and Reb M present in a concentration from 50 ppm to 350 ppm, 80 ppm to 350 ppm, 100 ppm to 350 ppm, 150 ppm to 350 ppm, 200 ppm to 350 ppm, 250 ppm to 350 ppm, 300 ppm to 350 ppm, 50 ppm to 320 ppm, 80 ppm to 320 ppm, 100 ppm to 320 ppm, 150 ppm to 320 ppm, 200 ppm to 320 ppm, 250 ppm to 320 ppm, 300 ppm to 320 ppm, 50 ppm to 300 ppm, 80 ppm to 300 ppm, 100 ppm to 300 ppm, 150 ppm to 300 ppm, 200 ppm to 300 ppm, 250 ppm to 300 ppm, 50 ppm to 250 ppm, 80 ppm to 250 ppm, 100 ppm to 250 ppm, 150 ppm to 250 ppm, 200 ppm to 250 ppm, 50 ppm to 200 ppm, 80 ppm to 200 ppm, 100 ppm to 200 ppm, 150 ppm to 200 ppm, 50 ppm to 150 ppm, 80 ppm to 150 ppm, 100 ppm to 150 ppm, 50 ppm to 100 ppm, 80 ppm to 100 ppm, or 50 ppm to 80 ppm.

An embodiment of the third aspect the method comprises combining Reb D and Reb M in a ratio from 1:4 to 4:1 and the pH of the beverage is from pH 1.8 to 2.8. It is demonstrated herein that at low pH the addition of Reb M helps to stabilise the lower concentrations of Reb D, when compared to the low concentration of Reb D alone. For example at pH 2.0 the 50 ppm Reb D sample degrades approx. 10% more than the 80 ppm Reb D sample in combination with 320 ppm Reb M. As such, it may be preferable to combine the Reb D and Reb M in a weight ratio from 1:4 to 1:2. Further, the Reb D and Reb M may be combined in a weight ratio from 1:4 to 1:2, wherein the Reb D is present in a concentration from 50 ppm to 150 ppm.

In an embodiment of the third aspect the method comprises combining Reb D and Reb M in the beverage at a weight ratio from 1:2 to 2:1, more preferably at a ratio of 1:1, and the pH is from pH 1.8 to 2.8.

In an embodiment of the third aspect the method comprises combining Reb D and Reb M in the beverage at a weight ratio from 1:2 to 2:1, preferably at a weight ratio of 1:1, and the pH is from pH 1.8 to 2.2.

In an embodiment of the third aspect the method comprises combining the Reb D and Reb M in an amount to produce a final total concentration of 200 ppm to 800 ppm, 200 ppm to 700 ppm, 200 ppm to 600 ppm, 200 ppm to 500 ppm, 200 ppm to 400 ppm, 300 ppm to 800 ppm, 300 pm to 700 ppm, 300 ppm, to 600 ppm, 300 ppm to 500 ppm, 300 ppm to 400 ppm, 400 ppm to 800 ppm, 400 ppm to 700 ppm, 400 ppm to 600 ppm, or 400 ppm to 500 ppm.

The methods of the present invention may comprise incorporating additional components as outlined for the first and second aspects.

The methods according to the second and third aspects of the invention may comprise preparing a carbonated beverage. The gas pressure may be from 1.0-3.5 kg/m$^3$. Preferably the $CO_2$ is at a gas pressure from 1.5-3.0 kg/m$^3$, more preferably the $CO_2$ is at a gas pressure from 2.0-3.0 kg/m$^3$.

The methods according to another embodiments of the second and third aspects of the invention may comprise preparing a carbonated beverage. The gas pressure may be from 1.0-3.5 kgf/cm$^2$. Preferably the $CO_2$ is at a gas pressure from 1.5-3.0 kgf/cm$^2$, more preferably the $CO_2$ is at a gas pressure from 2.0-3.0 kgf/cm$^2$.

The methods according to the second and third aspects of the invention may comprise preparing the beverage with any of the additional sweetening agents that have been listed above according to the first aspect of the invention.

The method according to the second and third aspects of the invention may comprise preparing the beverage with the addition of a buffer system, as described hereinbefore.

Examples

Figure 4:
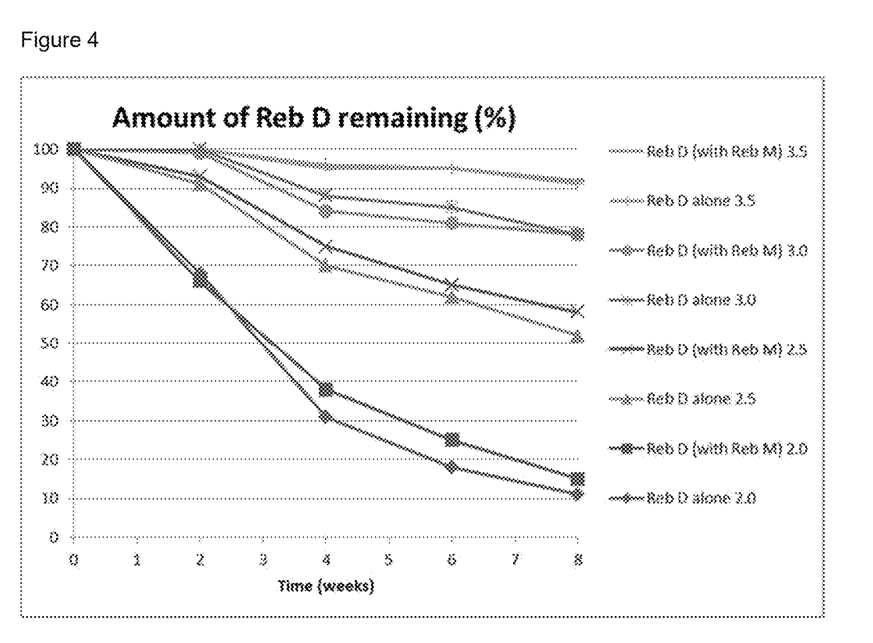
FIG. 4 shows the average amount of Reb D remaining at each time point for all concentrations of Reb D i.e the amount of Reb D degradation was averaged for the 50 ppm, 150 ppm, 250 ppm and 400 ppm samples. The graph also shows amount of Reb D remaining at each time point for all samples of Reb D which also contained Reb M i.e the amount of Reb D degradation was averaged for all samples which had a ratio of Reb D:Reb M.

A study was carried out as follows, samples were prepared comprising 50 ppm, 150 ppm, 250 ppm and 400 ppm, of Reb D and samples with the following ratios of Reb D:Reb M 1:4, 1:1, 4:1 wherein the total concentration of the sample was 400 ppm. The samples were prepared in phosphate buffer and the pH was adjusted using phosphoric acid. Samples were prepared at the following pH; 2.0, 2.5, 3.0 and 3.5. These samples were incubated at 40° C. for 8 weeks. This incubation protocol should mimic the degradation at room temperature over 6 months. The amount of Reb D and Reb M in each sample at T=0 was calculated by HPLC this was then used to calculate the amount of remaining Reb M in each sample at each specified time point. Aliquots were taken at 2, 4, 6 and 8 weeks and analysed by HPLC to determine the degradation of Reb D and combinations of Reb D and Reb M over the 8 week study. The data shows that both concentration and pH affect the degradation of Reb D. The data in FIG. 4 also demonstrates that at pH 2.0 and 2.5 the Reb D samples which also contained Reb M degraded less than the Reb D samples alone, indicating that Reb M can help to stabilise Reb D.

TABLE 2

| pH | Reb D conc (% w/w) | Reb M conc (% w/w) | % Reb D degradation 2 weeks | % Reb M degradation 2 weeks | % Reb D degradation 4 weeks | % Reb M degradation 4 weeks | % Reb D degradation 6 weeks | % Reb M degradation 6 weeks | % Reb D degradation 8 weeks | % Reb M degradation 8 weeks |
|---|---|---|---|---|---|---|---|---|---|---|
| 2 | 0.005 | | 37 | | 73 | | 84 | | 91 | |
| 2 | 0.015 | | 28 | | 70 | | 82 | | 90 | |
| 2 | 0.025 | | 32 | | 68 | | 81 | | 89 | |
| 2 | 0.04 | | 32 | | 66 | | 79 | | 86 | |
| 2 | 0.008 | 0.032 | 36 | 28 | 62 | 55 | 76 | 71 | 85 | 80 |
| 2 | 0.02 | 0.02 | 28 | 25 | 59 | 56 | 72 | 69 | 82 | 78 |
| 2 | 0.032 | 0.008 | 37 | 35 | 63 | 59 | 78 | 72 | 86 | 80 |
| 2.5 | 0.005 | | 11 | | 37 | | 44 | | 55 | |
| 2.5 | 0.015 | | 10 | | 32 | | 40 | | 50 | |
| 2.5 | 0.025 | | 8 | | 27 | | 34 | | 44 | |
| 2.5 | 0.04 | | 7 | | 25 | | 34 | | 43 | |
| 2.5 | 0.008 | 0.032 | 8 | 3 | 28 | 22 | 37 | 31 | 42 | 38 |
| 2.5 | 0.02 | 0.02 | 7 | 6 | 25 | 20 | 33 | 29 | 42 | 38 |
| 2.5 | 0.032 | 0.008 | 5 | 4 | 23 | 18 | 33 | 28 | 42 | 38 |
| 3 | 0.005 | | 0 | | 17 | | 22 | | 29 | |
| 3 | 0.015 | | 0 | | 11 | | 16 | | 22 | |
| 3 | 0.025 | | 1 | | 10 | | 13 | | 19 | |
| 3 | 0.04 | | 0 | | 9 | | 11 | | 18 | |
| 3 | 0.008 | 0.032 | 1 | 0 | 17 | 11 | 22 | 15 | 24 | 17 |
| 3 | 0.02 | 0.02 | 0 | 0 | 17 | 10 | 20 | 14 | 23 | 17 |

TABLE 2-continued

| pH | Reb D conc (% w/w) | Reb M conc (% w/w) | % Reb D degradation 2 weeks | % Reb M degradation 2 weeks | % Reb D degradation 4 weeks | % Reb M degradation 4 weeks | % Reb D degradation 6 weeks | % Reb M degradation 6 weeks | % Reb D degradation 8 weeks | % Reb M degradation 8 weeks |
|---|---|---|---|---|---|---|---|---|---|---|
| 3 | 0.032 | 0.008 | 1 | 0 | 14 | 7 | 17 | 12 | 20 | 15 |
| 3.5 | 0.005 |  | 1 |  | 10 |  | 14 |  | 20 |  |
| 3.5 | 0.015 |  | 0 |  | 4 |  | 5 |  | 8 |  |
| 3.5 | 0.025 |  | 0 |  | 2 |  | 2 |  | 5 |  |
| 3.5 | 0.04 |  | 1 |  | 1 |  | 1 |  | 5 |  |
| 3.5 | 0.008 | 0.032 | 0 | 0 | 6 | 4 | 6 | 4 | 9 | 6 |
| 3.5 | 0.02 | 0.02 | 0 | 0 | 6 | 3 | 8 | 4 | 9 | 7 |
| 3.5 | 0.032 | 0.008 | 1 | 0 | 2 | 0 | 2 | 2 | 5 | 5 |

The invention claimed is:

1. A beverage comprising from 50 ppm to 350 ppm of Reb D and from 50 ppm to 350 ppm of Reb M, and having a pH from pH 1.8 to 2.5, wherein the stability of Reb D is increased in the presence of Reb M.

2. The beverage of claim 1, wherein the ratio of Reb D:Reb M is from 1:4 to 4:1.

3. The beverage of claim 1, comprising from 80 ppm to 320 ppm of Reb D and from 80 ppm to 320 ppm of Reb M.

4. The beverage of claim 1, wherein the pH is from pH 1.8 to 2.2.

5. The beverage of claim 1, wherein the weight ratio of Reb D:Reb M is from 1:2 to 2:1.

6. The beverage of claim 1, wherein the weight ratio of Reb D:Reb M is about 1:1.

7. The beverage of claim 1, comprising from 150 ppm to 250 ppm of Reb D and from 150 ppm to 250 ppm of Reb M.

8. The beverage of claim 1, wherein the beverage comprises carbon dioxide gas at a gas pressure of 1.0-3.5 kgf/cm$^2$.

9. The beverage of claim 1, further comprising a sweetener selected from the group consisting of Reb A, Reb B, Reb C, Reb E, Reb F, Reb I, Reb H, Reb L, Reb K, Reb J, Reb N, Reb O, dulcoside A, dulcoside B, stevioside, steviolbioside, and rubusoside.

10. The beverage of claim 1, further comprising caffeine, cinnamaldehyde, phosphoric acid or caramel coloring.

11. The beverage of claim 3, wherein Reb D and Reb M are present in an amount to provide a sucrose equivalence of from 5% to 15%.

12. A method for improving the stability of Reb D in a beverage, comprising preparing a beverage comprising from 50 ppm to 350 ppm Reb D and from 50 ppm to 350 ppm Reb M, and having a pH from pH 1.8 to 2.5.

13. The method according to claim 12, wherein the pH of the beverage is from pH 1.8 to 2.2.

14. A method for improving the stability of Reb D in a beverage, comprising adding 50 ppm to 350 ppm of Reb M to a beverage comprising 50 ppm to 350 ppm of Reb D, wherein the beverage has a pH from pH 1.8 to 2.5.

15. The method according to claim 14, comprising preparing a beverage comprising from 80 ppm to 320 ppm of Reb D and from 80 ppm to 320 ppm of Reb M.

16. The method according to claim 15, wherein the pH of the beverage is from pH 1.8 to 2.2.

* * * * *